United States Patent
Saito et al.

(10) Patent No.: US 8,263,263 B2
(45) Date of Patent: Sep. 11, 2012

(54) NONAQUEOUS ELECTROLYTE SECONDARY BATTERY

(75) Inventors: Motoharu Saito, Hyogo (JP);
Katsutoshi Takeda, Tokushima (JP);
Masahisa Fujimoto, Osaka (JP);
Hiroshi Sawada, Aichi (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 55 days.

(21) Appl. No.: 12/532,483

(22) PCT Filed: Mar. 21, 2008

(86) PCT No.: PCT/JP2008/000679
§ 371 (c)(1),
(2), (4) Date: Sep. 22, 2009

(87) PCT Pub. No.: WO2008/114515
PCT Pub. Date: Sep. 25, 2008

(65) Prior Publication Data
US 2010/0129715 A1   May 27, 2010

(30) Foreign Application Priority Data
Mar. 22, 2007  (JP) .................. 2007-075257

(51) Int. Cl.
*H01M 4/13*  (2010.01)
*H01M 4/505* (2010.01)
*H01M 4/525* (2010.01)

(52) U.S. Cl. ............. 429/231.95; 429/224; 429/231.3; 429/231.9

(58) Field of Classification Search ........... 429/121–347
See application file for complete search history.

(56) References Cited

U.S. PATENT DOCUMENTS

| | | | |
|---|---|---|---|
| 5,955,052 | A | 9/1999 | Padhi |
| 5,981,106 | A | 11/1999 | Amine |
| 6,207,129 | B1 | 3/2001 | Padhi |
| 6,296,830 | B1 | 10/2001 | Oh |
| 6,306,542 | B1 | 10/2001 | Nakano |
| 2002/0098146 | A1 | 7/2002 | Takada |
| 2006/0222948 | A1 | 10/2006 | Kitao |

(Continued)

FOREIGN PATENT DOCUMENTS

EP   0 959 044 A1   11/1999

(Continued)

OTHER PUBLICATIONS

Eriksson et al. "Influence of substitution on the structure and electrochemistry of layered manganese oxides." Chemistry of Materials 15.23 (2003): 4456-4463.*

(Continued)

*Primary Examiner* — Basia Ridley
*Assistant Examiner* — James Lee
(74) *Attorney, Agent, or Firm* — Kratz, Quintos & Hanson, LLP

(57) ABSTRACT

A positive electrode active material is made of sodium containing oxide. The sodium containing oxide contains $Na_A Li_B MO_{2\pm\alpha}$ that belongs to a space group $P6_3/mmc$ of a hexagonal system, where the M includes at least one of manganese (Mn) and cobalt (Co). In the $Na_A Li_B MO_{2\pm\alpha}$, the composition ratio A of sodium (Na) is not less than 0.5 and not more than 1.1, the composition ratio B of lithium (Li) is larger than 0 and not more than 0.3, and the $\alpha$ is not less than 0 and not more than 0.3.

6 Claims, 6 Drawing Sheets

U.S. PATENT DOCUMENTS

2007/0218361 A1* 9/2007 Inoue et al. ............... 429/231.1

FOREIGN PATENT DOCUMENTS

| | | |
|---|---|---|
| JP | 10-3921 | 1/1998 |
| JP | 11-130438 | 5/1999 |
| JP | 11-263622 | 9/1999 |
| JP | 2000-34127 | 2/2000 |
| JP | 2000-203844 | 7/2000 |
| JP | 2002-220231 A1 | 8/2002 |
| JP | 2002-313337 A1 | 10/2002 |
| JP | 2006-278078 A1 | 10/2006 |

OTHER PUBLICATIONS

A. Kajiyama, et al.; "Synthesis and electrochemical properties of $Li_xCo_{0.5}Mn_{0.5}O_2$;" Solid State Ionics; vol. 149; 2002; pp; 39-45 (7 Sheets.)/p. 1.

* cited by examiner

F I G. 1
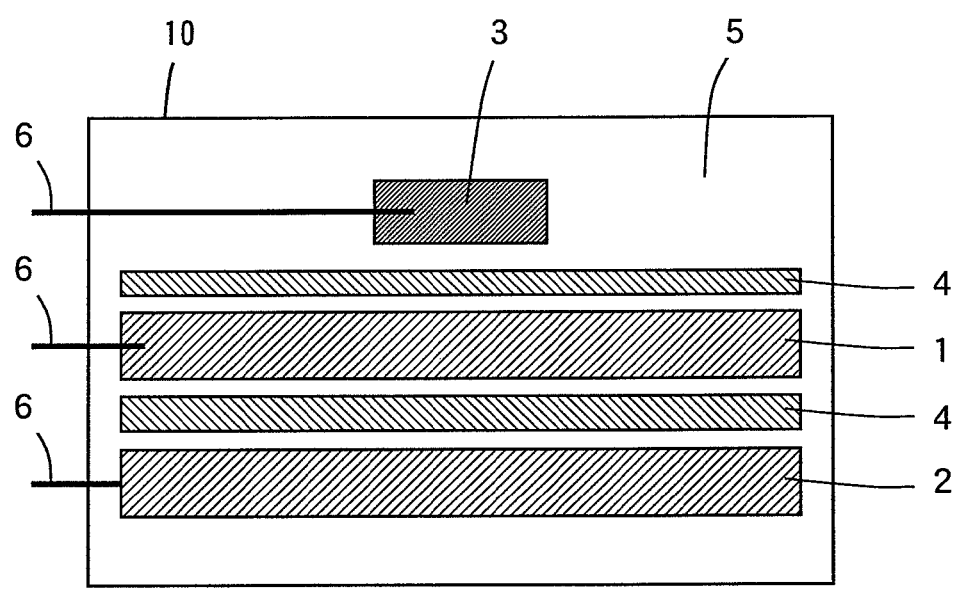

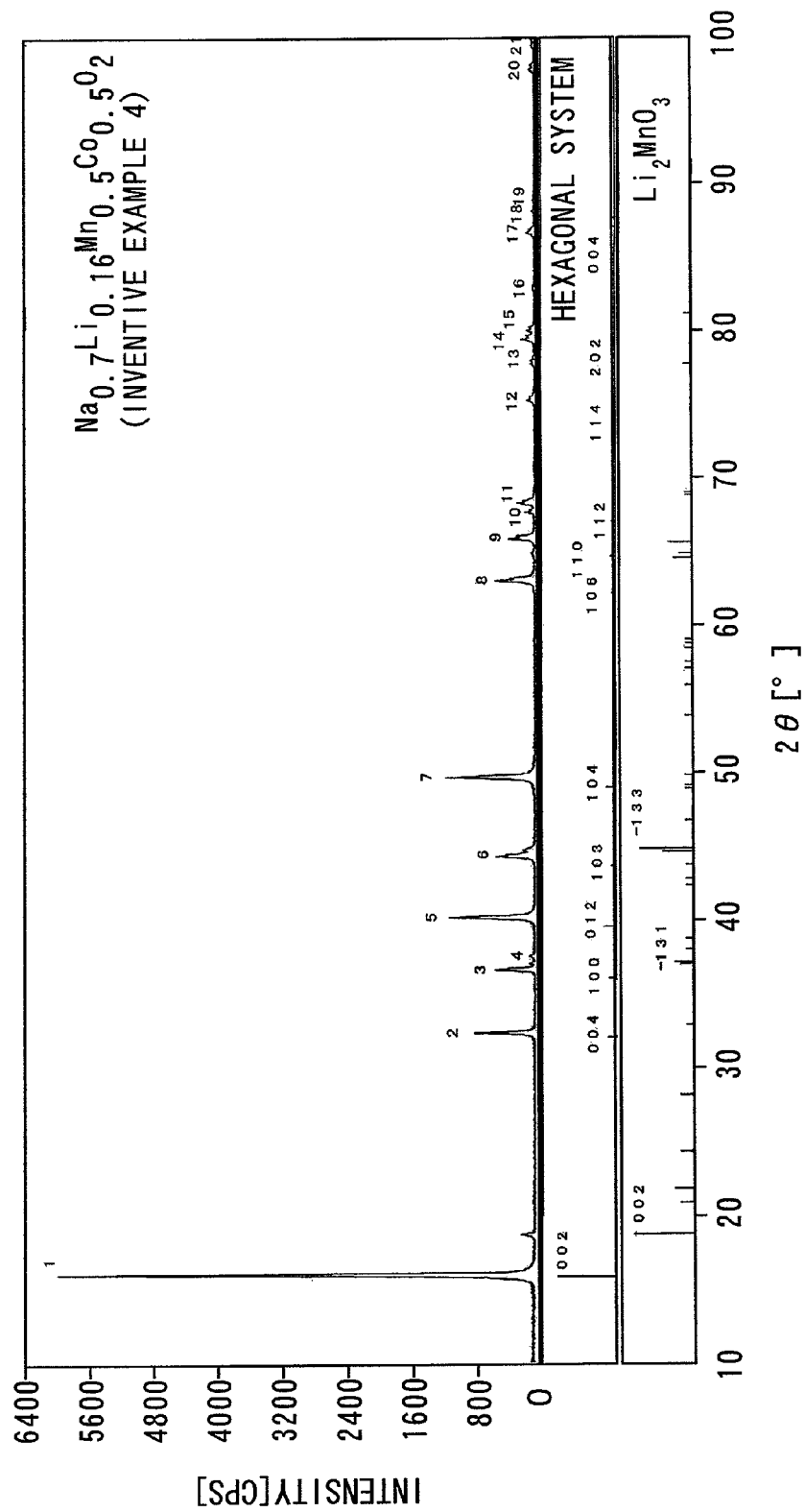
F I G. 2

NONAQUEOUS ELECTROLYTE SECONDARY BATTERY

TECHNICAL FIELD

The present invention relates to a nonaqueous electrolyte secondary battery including a positive electrode containing a positive electrode active material, a negative electrode, and a nonaqueous electrolyte.

BACKGROUND ART

Nonaqueous lithium ion secondary batteries employing nonaqueous electrolytes are utilized today as secondary batteries with high energy density. In a nonaqueous lithium ion secondary battery, transfer of lithium ions between a positive electrode and a negative electrode causes charges and discharges.

A lithium transition metal composite oxide having a layered structure such as lithium-cobalt oxide ($LiCoO_2$) is employed as the positive electrode, a carbon material capable of storing and releasing lithium, for example, is employed as the negative electrode, and a nonaqueous electrolyte produced by dissolving lithium salt such as lithium tetrafluoroborate ($LiBF_4$) or lithium hexafluorophosphate ($LiPF_6$) in an organic solvent such as ethylene carbonate or diethyl carbonate is used in such a nonaqueous lithium ion secondary battery.

Such nonaqueous lithium ion secondary batteries have recently been used as power supplies for various types of mobile equipment. With increasing power consumption due to expansion in functionality of the mobile equipment, however, it is desired that nonaqueous lithium ion secondary batteries have higher energy density.

Increased capacity of positive electrode materials is required to obtain nonaqueous lithium ion secondary batteries with high energy density. In particular, expectations for layered compounds are rising. Studies on many kinds of lithium containing layered compounds have so far been made, resulting in development of materials such as $LiCoO_2$, $LiNiO_2$ and $LiNi_{1/3}Co_{1/3}Mn_{1/3}O_2$.

A method for synthesizing a lithium compound via a sodium compound has been studied as a new synthesis method of a lithium compound. According to the method, a lithium containing layered compound, which is difficult to be synthesized, can be easily obtained. In particular, ion exchange of sodium for lithium allows $Na_{0.7}CoO_2$ and $NaCo_{1/2}Mn_{1/2}O_2$ to be utilized as a positive electrode active material for a lithium ion battery.

Therefore, studies have recently been made on an ion exchange method using a synthesis method of sodium containing layered compounds and chemical techniques.

[Patent Document 1] JP 2002-220231 A

[Nonpatent Document 1] Solid State Ionics 149 (2002) P. 39

DISCLOSURE OF THE INVENTION

Problems to be Solved by the Invention

When lithium is extracted from $LiCoO_2$ that is currently used for the positive electrode of the nonaqueous lithium ion secondary battery in the composition ratio of 0.5 or more (x=0.5 or more in $Li_{1-x}CoO_2$), such problems as decomposition of the crystal structure and decrease in reversibility may arise. Therefore, discharge capacity density that is available in $LiCoO_2$ is about 160 mAh/g.

If the nonaqueous lithium ion secondary batteries using $LiCoO_2$ as the positive electrode material is repeatedly charged and discharged until 5.0 V (vs. Li/Li+), the discharge capacity density is significantly decreased.

Meanwhile, the discharge capacity density of the lithium layered compound that is obtained through ion exchange of sodium in a sodium layered compound for lithium is as low as about 130 mAh/g.

Therefore, there is required such a positive electrode material that has a stable crystal structure, high discharge capacity density and a good cycle performance even though it is charged to high potentials to cause a significant amount of lithium to be extracted from a positive electrode active material.

An object of the present invention is to provide a nonaqueous electrolyte secondary battery having high capacity and a good cycle performance.

Means for Solving the Problems (1) According to an aspect of the present invention, a nonaqueous electrolyte secondary battery includes a positive electrode containing a positive electrode active material made of sodium containing oxide, a negative electrode and a nonaqueous electrolyte, wherein the sodium containing oxide contains $Na_ALi_BMO_{2\pm\alpha}$ $0.5 \leq A \leq 1.1$, $0 \leq B \leq 0.3$, and $0 \leq \alpha \leq 0.3$) that belongs to a space group $P6_3/mmc$ of a hexagonal system, where the M includes at least one of manganese and cobalt.

In the nonaqueous electrolyte secondary battery, the sodium containing oxide containing the $Na_ALi_BMO_{2\pm\alpha}$ ($0.5 \leq A \leq 1.1$, $0 \leq B \leq 0.3$, and $0 \leq \alpha \leq 0.3$) that belongs to the space group $P6_3/mmc$ of the hexagonal system is used as the positive electrode active material. Since the $Na_ALi_BMO_{2\pm\alpha}$ that belongs to the space group $P6_3/mmc$ of the hexagonal system has a stable crystal structure, the crystal structure is unlikely to decomposition even though the $Na_ALi_BMO_{2\pm\alpha}$ is charged to high potentials to cause large amounts of lithium to be extracted. This causes high charge-discharge capacity density to be obtained. In addition, repeating charges to the high potentials and discharges does not decrease the charge-discharge capacity density. Accordingly, the nonaqueous electrolyte secondary battery having high capacity and a good cycle performance is achieved.

(2) The sodium containing oxide may contain $Na_ALi_BMn_xCo_yO_{2\pm\alpha}$ ($0.5 \leq A \leq 1.1$, $0 < B \leq 0.3$, $0.40 \leq x \leq 0.60$, $0.40 \leq y \leq 0.60$, $0.80 \leq x+y \leq 1.20$, and $0 \leq \alpha \leq 0.3$), where a lattice constant a of the sodium containing oxide may be not less than 2.830 Å and not more than 2.840 Å, and a lattice constant c may be not less than 11.070 Å and not more than 11.090 Å.

The $Na_ALi_BMn_xCo_yO_{2\pm\alpha}$ ($0.5 \leq A \leq 1.1$, $0 < B \leq 0.3$, $0.40 \leq x \leq 0.60$, $0.40 \leq y \leq 0.60$, $0.80 \leq x-y \leq 1.20$, and $0 \leq \alpha \leq 0.3$) is used as the positive electrode active material, so that higher capacity and a better cycle performance can be obtained.

(3) The sodium containing oxide may be one or both of a solid solution and a mixture that have a peak in a range of a diffraction angle 2θ from 18.0° to 19.5° in an X-ray powder crystal diffraction spectrum using $CuK_\alpha$ as an X-ray source.

In this case, it is considered that the sodium containing oxide contains $Li_2MnO_3$ as either or both of a solid solution and a mixture. Thus, high charge-discharge capacity density can be obtained.

(4) The sodium containing oxide may have a first peak in a range of a diffraction angle 2θ from 15.5° to 16.5° and have a second peak in a range of the diffraction angle 2θ from 18.0° to 19.5° in an X-ray powder crystal diffraction spectrum using CuK$_\alpha$ as an X-ray source, and a ratio Ic/Ip of an intensity Ic of the second peak to an intensity Ip of the first peak may be larger than 0 and not more than 0.18.

In this case, it is considered that the sodium containing oxide contains Li$_2$MnO$_3$ as either or both of the solid solution and the mixture. Thus, high charge-discharge capacity density can be obtained. In addition, the ratio Ic/Ip of the intensity Ic of the second peak to the intensity Ip of the first peak is larger than 0 and not more than 0.18, so that high charge-discharge capacity density can be more reliably obtained.

(5) The negative electrode may include at least one selected from a group composed of lithium metal, silicon, carbon, tin, germanium, aluminum, lead, indium, gallium, a lithium containing alloy, a carbon material in which lithium is previously stored, and a silicon material in which lithium is previously stored.

The negative electrode composed of such a material is used, so that charge-discharge can be sufficiently carried out in the nonaqueous electrolyte secondary battery.

Effects of the Invention

According to the present invention, since the Na$_A$Li$_B$MO$_{2\pm\alpha}$ that belongs to the space group P6$_3$/mmc of the hexagonal system with the stable crystal structure is used as the positive electrode active material, the crystal structure is unlikely to decomposition even though the Na$_A$Li$_B$MO$_{2\pm\alpha}$ is charged to the high potentials to cause large amounts of lithium to be extracted. This causes high charge-discharge capacity density to be obtained. In addition, repeating charges and discharges to the high potentials does not decrease the charge-discharge capacity density. Accordingly, the nonaqueous electrolyte secondary battery having high capacity and a good cycle performance is achieved.

BRIEF DESCRIPTION OF THE DRAWINGS

FIG. 1 is a schematic explanatory view of a test cell of a nonaqueous electrolyte secondary battery according to the present embodiment.

FIG. 2 is a graph showing results of XRD measurement of a positive electrode active material of an inventive example 4.

BEST MODE FOR CARRYING OUT THE INVENTION

Figure 3:
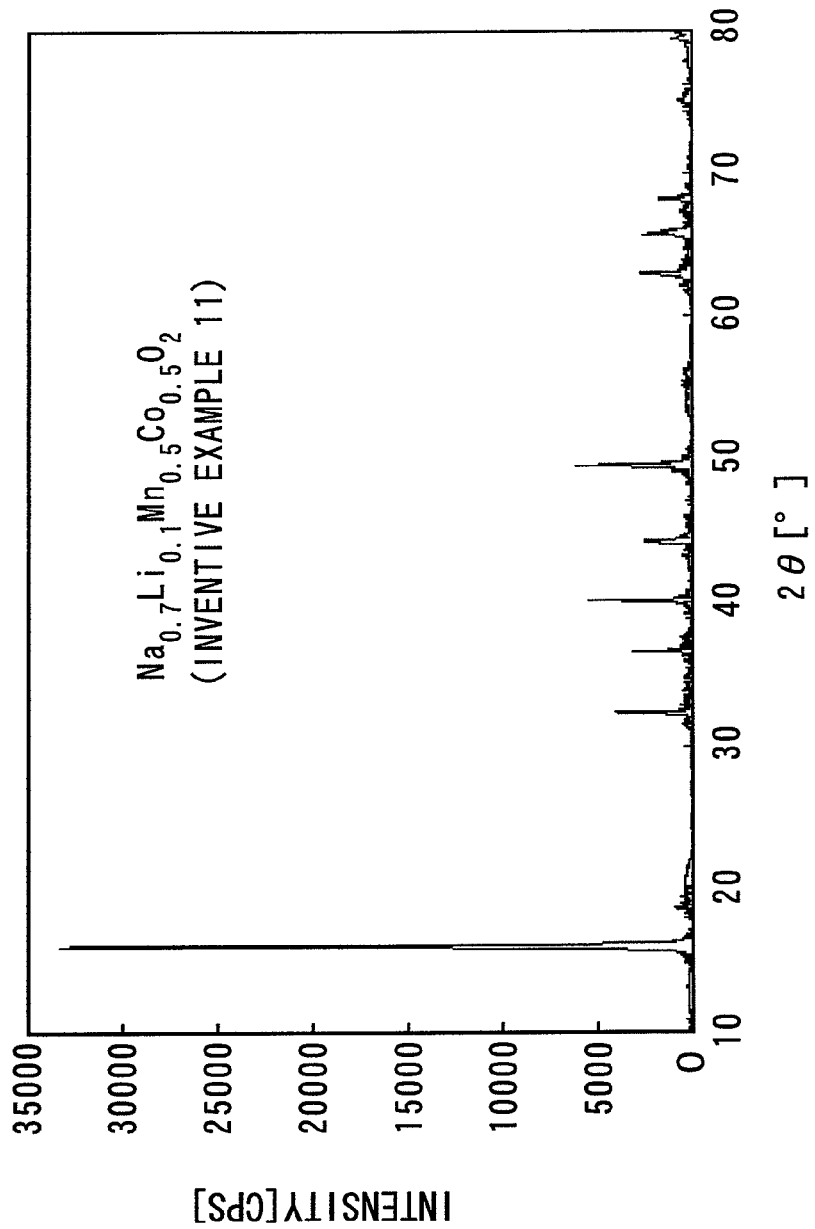
FIG. 3 is a graph showing results of the XRD measurement of a positive electrode active material of an inventive example 11.

The embodiments of the present invention will be described in detail referring to the drawings. The embodiments below describe a nonaqueous electrolyte secondary battery.

The nonaqueous electrolyte secondary battery according to the present embodiment is composed of a positive electrode, a negative electrode and a nonaqueous electrolyte, and transfer of lithium ions between the positive electrode and the negative electrode causes charges and discharges.

(1) Fabrication of the Positive Electrode

A positive electrode active material is made of a sodium containing oxide. The sodium containing oxide contains Na$_A$Li$_B$MO$_{2\pm\alpha}$ that belongs to a space group P6$_3$/mmc of a hexagonal system, where the M includes at least one of manganese (Mn) and cobalt (Co). In the Na$_A$LI$_B$MO$_{2\pm\alpha}$, the composition ratio A of sodium (Na) is not less than 0.5 and not more than 1.1, the composition ratio B of lithium (Li) is larger than 0 and not more than 0.3, and the $\alpha$ is not less than 0 and not more than 0.3.

When the composition ratio A of sodium (Na) in the sodium containing oxide is larger than 1.1, the amount of lithium ions (Li) that can be stored and released decreases in the sodium containing oxide. Thus, high charge-discharge capacity density cannot be obtained.

Meanwhile, when the composition ratio A of sodium (Na) in the sodium containing oxide is smaller than 0.5, the crystal structure of the sodium containing oxide is not sufficiently stabilized.

Accordingly, the composition ratio A of sodium (Na) in the Na$_A$Li$_B$MO$_{2\pm\alpha}$ is set not less than 0.5 and not more than 1.1.

When lithium (Li) is not contained in the sodium containing oxide, high charge-discharge capacity cannot be obtained. Moreover, when the composition ratio B of lithium (Li) in the sodium containing oxide is larger than 0.3, the crystal structure of the sodium containing oxide is not sufficiently stabilized. Conversely, when the composition ratio B of lithium (Li) in the sodium containing oxide is larger than 0 and not more than 0.3, the charge-discharge capacity density is dramatically improved.

Accordingly, the composition ratio B of lithium (Li) in the sodium containing oxide is set larger than 0 and not more than 0.3.

When the Na$_A$Li$_B$MO$_{2\pm\alpha}$ contains manganese (Mn) or cobalt (Co) as M, oxidation and reduction can be carried out at a high potential. Therefore, the charge-discharge capacity density of the nonaqueous electrolyte secondary battery can be increased and a good cycle performance can be maintained. In particular, manganese that is abundant as a resource is available at low cost. Thus, energy density of the nonaqueous electrolyte secondary battery can be increased and a good cycle performance can be maintained at reduced cost.

If the amount of oxygen (O) in the sodium-containing oxide is too large, the sites where a transition metal (M), sodium (Na) or lithium (Li) should be present could be occupied by oxygen. Meanwhile, if the amount of oxygen is too small, an oxygen lacking oxide results, which causes the crystal structure to have many defects. It has been experimentally known that high charge-discharge capacity density and a good cycle performance can be maintained when the $\alpha$ in the Na$_A$Li$_B$MO$_{2\pm\alpha}$ is not less than 0 and not more than 0.3. Thus, the composition ratio (2±$\alpha$) of oxygen (O) is set in the foregoing range.

In particular, the sodium containing oxide preferably contains Na$_A$Li$_B$Mn$_x$Co$_y$O$_{2\pm\alpha}$ (0.5≦A≦1.1, 0<B≦0.3, 0.40≦x≦0.60, 0.40≦y≦0.60, 0.80≦x+y≦1.20, and 0≦$\alpha$≦0.3).

When the sodium containing oxide contains manganese (Mn) and cobalt (Co), where the composition ratio x of manganese (Mn) is not less than 0.40 and not more than 0.60 and the composition ratio y of cobalt (Co) is not less than 0.40 and not more than 0.60, the crystal structure thereof is more stabilized than when the sodium containing oxide separately contains manganese or cobalt. In addition, containing cobalt allows oxidation and reduction at higher potentials to be carried out than when manganese is separately contained. Therefore, the further improved capacity can be achieved and the better cycle performance can be maintained.

It is considered from results of X-ray diffraction measurement that high capacity and a good cycle performance can be obtained when the lattice constant a of the sodium containing oxide is not less than 2.830 Å and not more than 2.840 Å and the lattice constant c thereof is not less than 11.070 Å and not more than 11.090 Å.

In such a sodium containing oxide, a diffraction angle 2θ preferably has a peak in a range from 18.0° to 19.5° in X-ray powder crystal diffraction measurement using $CuK_\alpha$.

In this case, it is considered that the sodium containing oxide contains $Li_2MnO_3$ as a solid solution, a mixture or both of them. This allows high charge-discharge capacity density to be obtained.

Note that a peak appearing in a range of the diffraction angle 2θ from 15.5° to 16.5° can be fitted to a main peak of the sodium oxide that belongs to the space group $P6_3/mmc$. Moreover, a peak appearing in a range of the diffraction angle 2θ from 18.0° to 19.0° can be fitted to a main peak of $Li_2MnO_3$ or $Li_2Mn_{1-x}M'_xO_3$ (M' is at least one of Co, Ni, Fe, Ti, Zr, Al, Mg, B, Ru, Pt, Mo and Ir) that belongs to a space group C2/c or C2/m.

Addition of a dissimilar metal as the M' to the $Li_2MnO_3$ structure as a main frame provides such effects as increased charge-discharge capacity, improved battery performance in high temperature, a higher level of battery safety, suppression of gas generation and so on. In particular, the addition of Ni or Co as the M' sufficiently provides the foregoing effects.

The sodium containing oxide preferably contains an oxide of less than 35 mol % that belongs to the space group C2/c or C2/m of a monoclinic system as the solid solution, the mixture or both of them, and more preferably contains an oxide of less than 30 mol % that belongs to the space group C2/c or C2/m of the monoclinic system as the solid solution, the mixture or both of them. In this case, high charge-discharge capacity density can be obtained while a basic frame of the sodium containing oxide can be sufficiently maintained.

In particular, the sodium containing oxide preferably contains $Li_2MnO_3$ of less than 35 mol % as the solid solution, the mixture or both of them, and more preferably contains $Li_2MnO_3$ of less than 30 mol % as the solid solution, the mixture or both of them. In this case, high charge-discharge capacity density can be obtained while a basic frame of the sodium containing oxide can be sufficiently maintained.

The foregoing solid solution is considered to be an interstitial solid solution or a substitutional solid solution. The foregoing mixture is considered to be obtained by not only mixture at a particle level but also mixture or binding at a crystallite level.

Moreover, a conductive agent may be added in fabrication of the positive electrode containing the positive electrode active material. When the positive electrode active material has electrical conductivity, addition of the conductive agent further improves the electrical conductivity, resulting in good charge-discharge performance. When the positive electrode active material has low electrical conductivity, the use of the conductive agent allows the positive electrode active material to reliably function as the positive electrode.

The conductive agent may be any conductive material, and at least one of oxide, carbide, nitride, and a carbon material that have good electrical conductivity in particular may be used. Examples of the oxide may include tin oxide and indium oxide. Examples of the carbide may include tungsten carbide and zirconium carbide. Examples of the nitride may include titanium nitride and tantalum nitride.

Note that if such a conductive agent is added as described above and the added amount is not enough, the electrical conductivity of the positive electrode cannot be sufficiently improved, while if the added amount is excessive, the ratio of the positive electrode active material contained in the positive electrode is reduced, and high energy density cannot be obtained. Therefore, the amount of the conductive agent to be added falls within a range from 0% to 30% by weight of the entire positive electrode, preferably within a range from 0% to 20% by weight, and more preferably within a range from 0% to 10% by weight.

Examples of a binder to be added to the positive electrode may include at least one of polytetrafluoroethylene, polyvinylidene fluoride, polyethylene oxide, polyvinyl acetate, polymethacrylate, polyacrylate, polyacrylonitrile, polyvinyl alcohol, styrene-butadiene rubber, and carboxymethylcellulose.

If the amount of the binder to be added to the positive electrode is excessive, the ratio of the positive electrode active material contained in the positive electrode is reduced, and therefore high energy density cannot be obtained. Therefore, the amount of the binder falls within a range from 0% to 30% by weight, preferably within a range from 0% to 20% by weight, more preferably within a range from 0% to 10% by weight.

(2) Fabrication of the Nonaqueous Electrolyte

The non-aqueous electrolyte that includes an electrolytic salt dissolved in a non-aqueous solvent can be used.

Examples of the nonaqueous solvent may include a cyclic carbonate, a chain carbonate, esters, cyclic ethers, chain ethers, nitriles, amides, and a combination thereof.

Examples of the cyclic carbonate may include ethylene carbonate, propylene carbonate, butylene carbonate, and any of the above having its hydrogen group partly or entirely fluorinated such as trifluoropropylene carbonate and fluoroethylene carbonate.

Examples of the chain carbonate may include dimethyl carbonate, ethyl methyl carbonate, diethyl carbonate, methyl propyl carbonate, ethyl propyl carbonate, methyl isopropyl carbonate, and any of the above having its hydrogen group partly or entirely fluorinated.

Examples of the esters may include methyl acetate, ethyl acetate, propyl acetate, methyl propionate, ethyl propionate, and γ-butyrolactone. Examples of the cyclic ethers may include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineol, and crown ether.

Examples of the chain ethers may include 1,2-dimethoxyethane, diethyl ether, dipropyl ether, diisopropyl ether, dibutyl ether, dihexyl ether, ethyl vinyl ether, butyl vinyl ether, methylphenyl ether, ethylphenyl ether, butylphenyl ether, pentylphenyl ether, methoxytoluene, benzylethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

Examples of the nitriles may include acetonitrile, and examples of the amides may include dimethylformamide.

An electrolyte salt that is generally used in nonaqueous lithium ion secondary batteries can be used as the electrolyte salt. For example, lithium borate tetrafluoride ($LiBF_4$), lithium phosphate hexafluoride ($LiPF_6$), $LiCF_3SO_3$, $LiC_4F_9SO_3$, $LiN(CF_3SO_2)_3$, $LiN(C_2F_5SO_2)_2$, $LiAsF_6$ or difluoro(oxalato)lithium borate can be used.

One or combinations of not less than two of the above-mentioned electrolyte salts may be used.

(3) Structure of the Negative Electrode

One or plurality of lithium metal (Li), silicon (Si), carbon (C), tin (Sn), germanium (Ge), aluminum (Al), lead (Pb), indium (In), gallium (Ga), a lithium containing alloy, a carbon material in which lithium is previously stored and a silicon material in which lithium is previously stored can be used as a negative electrode material.

(4) Fabrication of the Nonaqueous Electrolyte Secondary Battery

The nonaqueous electrolyte secondary battery is fabricated as follows using the foregoing positive electrode, negative electrode and nonaqueous electrolyte.

FIG. 1 is a schematic explanatory view of a test cell of the nonaqueous electrolyte secondary battery according to the present embodiment.

As shown in FIG. 1, under an inert atmosphere, a lead is attached to the foregoing positive electrode to form a working electrode 1, and a lead is attached to the negative electrode that is made of lithium metal, for example, to form a counter electrode 2.

Next, a separator 4 is inserted between the working electrode 1 and the counter electrode 2, and then the working electrode 1, the counter electrode 2, and a reference electrode 3 that is made of lithium metal, for example, are arranged in a laminate vessel 10. The above-described nonaqueous electrolyte 5 is injected into the laminate vessel 10 to fabricate the nonaqueous electrolyte secondary battery as the test cell. Note that a separator 4 is also inserted between the working electrode 2 and the reference electrode 3.

(5) Effects of the Present Embodiment

In the nonaqueous electrolyte secondary battery according to the present embodiment, transfer of lithium ions between the positive electrode and the negative electrode causes charges and discharges. The positive electrode active material contains the $Na_ALi_BMO_{2\pm\alpha}$, ($0.5 \leq A \leq 1.1$, $0 \leq B \leq 0.3$, and $0 \leq \alpha \leq 0.3$) that belongs to the space group $P6_3/mmc$ of the hexagonal system, where the M includes at least one of manganese and cobalt. In this case, the crystal structure is unlikely to decomposition even though a significant amount of lithium is extracted because of charging to high potentials. This causes high charge-discharge capacity density to be obtained. In addition, repeating charges and discharges to the high potentials does not decrease the charge-discharge capacity density. Accordingly, the nonaqueous electrolyte secondary battery having high capacity and a good cycle performance is achieved.

(6) Inventive Examples and Comparative Examples (6-1) Inventive Examples 1 to 10 and Comparative Example 1

In inventive examples 1 to 10 and a comparative example 1, test cells of the nonaqueous electrolyte secondary battery were fabricated using positive electrode active materials of various compositions, and charge-discharge performance were examined.

(a) Fabrication of the Test Cells

In the inventive example 1, sodium carbonate ($Na_2CO_3$), lithium carbonate ($Li_2CO_3$), manganese dioxide ($MO_2$) and cobalt oxide (II III) ($Co_3O_4$) were used as starting materials of the positive electrode active material. These materials were prepared such that a composition was $Na_{0.8}Li_{0.05}Mn_{0.5}Co_{0.5}O_2$ to be mixed, and fired for 10 hours at 750° C. The fired powder was again mixed, and fired for 20 hours at 900° C. The fired powder was then ground with the use of an agate mortar, so that the positive electrode active material was obtained.

In each of the inventive examples 2, 3, sodium carbonate ($Na_2CO_3$), lithium carbonate ($Li_2CO_3$), manganese dioxide ($MnO_2$) and cobalt oxide (II III) ($Co_3O_4$) were used as starting materials of the positive electrode active material. These materials were prepared such that respective compositions were $Na_{0.7}Li_{0.08}Mn_{0.5}Co_{0.5}O_2$ and $Na_{0.7}Li_{0.14}Mn_{0.5}Co_{0.5}O_2$ to be mixed, and fired for 10 hours at 700° C. The fired powders were each again mixed, and fired for 20 hours at 900° C. The fired powders were then ground with the use of an agate mortar, so that the positive electrode active materials were obtained.

In the inventive example 4, sodium nitrate ($NaNO_3$), lithium carbonate ($Li_2CO_3$), manganese oxide (III)($Mn_2O_3$) and cobalt oxide (II III) ($Co_3O_4$) were used as starting materials of the positive electrode active material. These materials were prepared such that a composition was $Na_{0.7}Li_{0.16}Mn_{0.5}Co_{0.5}O_2$ to be mixed, formed into pellets, and fired for 10 hours at 700° C. After the firing, the pellets were crushed to be mixed, and fired for 20 hours at 900° C. The fired powder was then ground with the use of an agate mortar, so that the positive electrode active material was obtained.

In each of the inventive examples 5, 6, 8, 9, sodium oxalate ($NaC_2O_4$), lithium carbonate ($Li_2Co_3$), manganese oxide (III) ($Mn_2O_3$) and cobalt oxide (II III) ($Co_3O_4$) were used as starting materials of the positive electrode active material. These materials were prepared such that a composition was $Na_{0.7}Li_xMn_{0.5}Co_{05}O_2$ to be mixed, formed into pellets, and fired for 10 hours at 700° C., where the x was 0.18 in the inventive example 5, 0.20 in the inventive example 6, 0.22 in the inventive example 8 and 0.24 in the inventive example 9. After the firing, the pellets were crushed to be mixed, and fired for 20 hours at 900° C. The fired powders were then ground with the use of an agate mortar, so that the positive electrode active materials were obtained.

In the inventive example 7, sodium acetate ($CH_3COONa$), lithium carbonate ($Li_2CO_3$), manganese oxide (III)($Mn_2O_3$) and cobalt oxide (II III) ($Co_3O_4$) were used as starting materials of the positive electrode active material. These materials were prepared such that a composition was $Na_{0.7}Li_{0.2}Mn_{0.4}Co_{0.8}O_2$ to be mixed, formed into pellets, and fired for 10 hours at 700° C. After the firing, the pellets were crushed to be mixed, and fired for 20 hours at 900° C. The fired powder was then ground with the use of an agate mortar, so that the positive electrode active material was obtained.

In the comparative example 1, sodium carbonate ($Na_2CO_3$), lithium carbonate ($Li_2CO_3$), manganese dioxide ($MnO_2$) and cobalt oxide (II III) ($CO_3O_4$) were used as starting materials of the positive electrode active material. These materials were prepared such that a composition was $Na_{0.7}Mn_{0.5}Co_{0.5}O_2$ to be mixed, and fired for 10 hours at 750° C. The fired powder was again mixed, and fired for 20 hours at 900° C. The fired powder was then ground with the use of an agate mortar, so that the positive electrode active material was obtained.

Table 1 shows the composition formulae of the positive electrode active materials of the inventive examples 1 to 10 and the comparative example 1.

TABLE 1

| No. | COMPOSITION FORMULA | DISCHARGE CAPACITY DENSITY [mAh/g] (CHARGE-DISCHARGE RANGE 2.5-4.5 V) | DISCHARGE CAPACITY DENSITY [mAh/g] (CHARGE-DISCHARGE RANGE 2.5-5.0 V) | AVERAGE POTENTIAL [V] [Li/Li$^+$] |
|---|---|---|---|---|
| INVENTIVE EXAMPLE 1 | $Na_{0.8}Li_{0.05}Mn_{0.5}Co_{0.5}O_2$ | 117 | 180 | 3.67 |
| INVENTIVE EXAMPLE 2 | $Na_{0.7}Li_{0.08}Mn_{0.5}Co_{0.5}O_2$ | 127 | 178 | 3.71 |
| INVENTIVE EXAMPLE 3 | $Na_{0.7}Li_{0.14}Mn_{0.5}Co_{0.5}O_2$ | 122 | 184 | 3.69 |
| INVENTIVE EXAMPLE 4 | $Na_{0.7}Li_{0.16}Mn_{0.5}Co_{0.5}O_2$ | 134 | 192 | 3.66 |
| INVENTIVE EXAMPLE 5 | $Na_{0.7}Li_{0.18}Mn_{0.5}Co_{0.5}O_2$ | 127 | 187 | 3.70 |
| INVENTIVE EXAMPLE 6 | $Na_{0.7}Li_{0.20}Mn_{0.5}Co_{0.5}O_2$ | 125 | 183 | 3.72 |
| INVENTIVE EXAMPLE 7 | $Na_{0.7}Li_{0.20}Mn_{0.4}Co_{0.6}O_2$ | 124 | 172 | 3.82 |
| INVENTIVE EXAMPLE 8 | $Na_{0.7}Li_{0.22}Mn_{0.5}Co_{0.5}O_2$ | 118 | 174 | 3.72 |
| INVENTIVE EXAMPLE 9 | $Na_{0.7}Li_{0.24}Mn_{0.5}Co_{0.5}O_2$ | 121 | 174 | 3.73 |
| INVENTIVE EXAMPLE 10 | $Na_{0.7}Li_{0.26}Mn_{0.5}Co_{0.5}O_2$ | 121 | 175 | 3.73 |
| COMPARATIVE EXAMPLE 1 | $Na_{0.7}Mn_{0.5}Co_{0.5}O_2$ | 107 | 153 | 3.70 |

Each of the positive electrode active materials produced as described above, acetylene black as the conductive agent and polyvinylidene fluoride as the binder were mixed at a ratio of 80% by weight, 10% by weight and 10% by weight, respectively, and dissolved in N-methyl-2-pyrrolidone, thus producing slurry as a positive electrode mixture.

Then, the produced slurry was applied on a positive electrode collector of an aluminum foil by a doctor blade method, dried, and then rolled using a roller, so that a positive electrode active material layer was formed. A collector tab of aluminum was attached to a region of the positive electrode collector where the positive electrode active material layer was not formed. Then, drying at 110° C. in a vacuum was carried out, followed by molding to produce the working electrode 1 (positive electrode).

Lithium metal cut in a predetermined size was used for the counter electrode 2 (negative electrode). Moreover, lithium metal was cut in a predetermined size, so that the reference electrode 3 was prepared.

A non-aqueous solvent obtained by mixing ethylene carbonate and diethyl carbonate at a volume ratio of 30:70 to which lithium phosphate hexafluoride (LiPF$_6$) as the electrolyte salt was added at a concentration of 1.0 mol/l was used as the nonaqueous electrolyte 5.

The test cell of the nonaqueous electrolyte secondary battery of FIG. 1 was fabricated using the foregoing working electrode 1 (positive electrode), counter electrode 2 (negative electrode), reference electrode 3 and nonaqueous electrolyte 5.

The composition ratio of sodium (Na) in the positive electrode active material of the inventive example 1 was 0.8, and the composition ratio of sodium (Na) in each of the positive electrode active materials of the inventive examples 2 to 10 and the comparative example 1 was 0.7. The composition ratios of lithium (Li) in the positive electrode active materials of the inventive examples 1 to 10 increase in order from 0.05 to 0.26, and the positive electrode active material of the comparative example 1 does not contain lithium (Li). The composition ratio of manganese (Mn) was 0.5 and the composition ratio of cobalt (Co) was 0.5 in each of the positive electrode active materials of the inventive examples 1 to 6, 8 to 10 and the comparative example 1. Note that the composition ratio of manganese (Mn) was 0.4 and the composition ratio of cobalt (Co) was 0.6 in the positive electrode active material of the inventive example 7.

(b) Charge-discharge Test

The test cells of the inventive examples 1 to 10 and the comparative example 1 were charged to a charge cutoff potential 4.5 V (vs. Li/Li$^+$), and then discharged to a discharge cutoff potential 2.5 V (vs. Li/Li$^+$). After three cycles of charge-discharge, the test cells were charged while the charge cutoff potential was changed to 5.0 V (vs. Li/Li$^+$), followed by discharge to the discharge cutoff potential 2.5 V (vs. Li/Li$^+$).

(c) XRD Measurement of the Positive Electrode Active Material

The $Na_{0.7}Li_{0.16}Mn_{0.5}O_2$ that was produced in the inventive example 4 was measured by an XRD (X-ray diffractometer).

The XRD measurement was carried out using the CuK$_\alpha$ as an X-ray source in the range of the diffraction angle 2θ=10° to 80°.

An upper stage of FIG. 2 shows a result of measurement of the $Na_{0.7}Li_{0.18}Mn_{0.5}Co_{0.5}O_2$ produced in the inventive example 4. A middle stage of FIG. 2 shows X-ray diffraction data of $Na_{0.67}Ni_{0.33}Mn_{0.67}O_2$ (PDF#54-0894) that belongs to the space group P6$_3$/mmc of the hexagonal system in Powder Diffraction File (PDF) of the powder X-ray database (International Center for Diffraction Data; ICDD). A lower stage of FIG. 2 shows X-ray diffraction data of $Li_2MnO_3$ (PDF#27-1252) that belongs to the space group C2/c of the monoclinic system in the PDF.

Note that $Li_2MnO_3$ has four PDF numbers (#27-1252, #73-0152, #81-1953 and #84-1634). A (002) peak appears in a range of the diffraction angle 2θ from 18.0° to 19.5° in all the X-ray diffraction data corresponding to these PDF numbers. #27-1252, #73-0152 and #81-1953 of the four PDF numbers correspond to $Li_2MnO_3$ that belongs to the space group C2/c, and #84-1634 corresponds to $Li_2MnO_3$ that belongs to the space group C2/m. Accordingly, it is considered that $Li_2MnO_3$ and $Li_2Mn_{1-x}Co_xO_3$ that is produced by replacing part of manganese of $Li_2MnO_3$ with cobalt are structures that belong to the space group C2/c or C/m.

In the X-ray diffraction data of the $Na_{0.7}Li_{0.16}Mn_{0.5}Co_{0.5}O_2$ in the upper stage of FIG. 2 (a), the peak appears in the range of the diffraction angle 2θ from 18.0° to 19.5°. Comparison with the X-ray diffraction data in the middle stage of FIG. 2 (b) indicates that the $Na_{0.7}Li_{0.16}Mn_{0.5}Co_{0.5}O_2$ has the crystal structure that belongs to the space group $P6_3/mmc$ of the hexagonal system.

Moreover, it is considered from comparison with the X-ray diffraction data in the lower stage of FIG. 2 (b) that the $Na_{0.7}Li_{0.16}Mn_{0.5}O_2$ is a solid solution, a mixture or both of them that contain $Li_2MnO_3$.

(d) Evaluation

Table 1 shows results of measurement of the discharge capacity density and average potentials in the test cells of the inventive examples 1 to 10 and the comparative example 1.

The discharge capacity density is a value obtained by dividing a current flowing into the test cell by the weight of the positive electrode active material. The average potential is an average value of the potential in the charge-discharge range 2.5-5.0 V (vs. $Li/Li^+$).

using the obtained positive electrode active materials in the same manner as the inventive example 1.

The charge-discharge test was carried out in the test cells with the charge-discharge range of 2.5-5.0 V.

The X-ray powder crystal diffraction measurement using the CuKα as the X-ray source was carried out to the positive electrode active materials of the inventive examples 11 to 13. FIG. 3 shows results of the X-ray powder crystal diffraction measurement that was carried out to the positive electrode active material of the inventive example 11.

A ratio (Ic/Ip) of intensity of the peak (Ic) that is assumed to be the peak (002) of $Li_2Mn_{1-x}Co_xO_3$ ($0 \leq x \leq 0.5$ being present at the diffraction angle 2θ=18.0° to 19.5° and belongs to the space group C2/c or C2/m to intensity of the peak (Ip) that is assumed to be the peak (002) of the sodium oxide being present at the diffraction angle 2θ=15.5° to 16.5° and belongs to the space group $P6_3/mmc$ was calculated from the results of the measurement. The results of the charge-discharge tests and the calculated ratio of the peak intensities (Ic/Ip) are shown in Table 2.

TABLE 2

| No. | COMPOSITION FORMULA | DISCHARGE CAPACITY [mAh/g] (CHARGE-DISCHARGE RANGE 2.5-4.5 V) | DISCHARGE CAPACITY [mAh/g] (CHARGE-DISCHARGE RANGE 2.5-5.0 V) | AVERAGE POTENTIAL [V] [$Li/Li^+$] | RATIO [Ic/Ip] |
|---|---|---|---|---|---|
| INVENTIVE EXAMPLE 11 | $Na_{0.7}Li_{0.1}Mn_{0.5}Co_{0.5}O_2$ | 132 | 207 | 3.65 | 0.011 |
| INVENTIVE EXAMPLE 12 | $Na_{0.7}Li_{0.2}Mn_{0.5}Co_{0.5}O_2$ | 138 | 204 | 3.67 | 0.072 |
| INVENTIVE EXAMPLE 13 | $Na_{0.7}Li_{0.3}Mn_{0.5}Co_{0.5}O_2$ | 126 | 182 | 3.72 | 0.181 |

As can be seen from Table 1, the discharge capacity density in the charge-discharge range 2.5-5.0 V was as high as 174 mAh/g or more in the test cells of the inventive examples 1 to 10 using the positive electrode active materials with the lithium (Li) composition ratios of 0.05 to 0.26.

In contrast, the discharge capacity density in the charge-discharge range 2.5-5.0 V was as low as 153 mAh/g in the test cell of the comparative example 1 using the positive electrode active material not containing lithium (Li).

These results show that the positive electrode active material that contains the sodium containing oxide $Na_ALi_BMn_xCo_yO_{2\pm\alpha}$ ($0.5 \leq A \leq 1.1$, $0 < B \leq 0.3$, $0.40 \leq x \leq 0.60$, $0.40 \leq y \leq 0.60$, $0.90 \leq x+y \leq 1.10$, and $0 \leq \alpha \leq 0.3$) has high capacity and a good cycle performance even though charge-discharge to high potentials is repeatedly carried out.

(6-2) Inventive Examples 11 to 13

In each of the inventive examples 11 to 13, sodium carbonate ($Na_2CO_3$), lithium carbonate ($Li_2CO_3$), manganese oxide (III) ($Mn_2O_3$) and cobalt oxide (II III) ($Co_3O_4$) were used as starting materials of the positive electrode active material. These materials were prepared such that a composition is $Na_{0.7}Li_xMn_{0.5}Co_{0.5}O_2$ to be mixed, where x is 0.1 in the inventive example 11, 0.2 in the inventive example 12, and 0.3 in the inventive example 13. The mixed powder was put in a pellet former for pellets each having a diameter of two centimeters, and formed into pellets by applying a pressure of 8 t.

The pellets were set in an alumina crucible, and introduced into an electric furnace. Temperature in the electric furnace was raised to 700° C. in two hours, and held for 10 hours, followed by furnace cooling. The fired powders were ground with the use of an agate mortar, so that the positive electrode active materials were obtained. The test cells were fabricated In the inventive examples 11 to 13, discharge capacities that were higher than that of the comparative example 1 (Ic/Ip=0) shown in Table 1 were obtained as shown in Table 2. Moreover, higher discharge capacities than that of the inventive example 13 were obtained in the inventive examples 11, 12. The results indicate that existence of the sodium oxide having the structure that belongs to C2/c or C2/m improves the discharge capacity. Furthermore, it was found that higher discharge capacity was obtained when 0<Ic/Ip<1.8.

Note that sodium oxides of various compositions were formed in the same manner as the inventive example 1, and the X-ray powder crystal diffraction measurement using the CuKα as the X-ray source was carried out to the sodium oxides. Ratios (Ic/Ip) of intensity of the peak that is present at the diffraction angle 2θ=18.0° to 19.5° to intensity of the peak that is present at θ=15.5° to 16.5° was calculated from the results of the measurement. The results are shown in Table 3.

TABLE 3

| PREPARED COMPOSITION | RATIO[Ic/Ip] |
|---|---|
| $Na_{0.7}Mn_{0.5}Co_{0.5}O_2$ | 0 |
| $Na_{0.7}Li_{0.1}Mn_{0.5}Co_{0.5}O_2$ | 0.011 |
| $Na_{0.6}Li_{0.1}Mn_{0.5}Co_{0.5}O_2$ | 0.028 |
| $Na_{0.7}Li_{0.2}Mn_{0.5}Co_{0.5}O_2$ | 0.072 |
| $Na_{0.8}Li_{0.2}Mn_{0.5}Co_{0.5}O_2$ | 0.078 |
| $NaLi_{0.2}Mn_{0.5}Co_{0.5}O_2$ | 0.094 |
| $NaLi_{0.2}Mn_{0.5}Co_{0.25}Ni_{0.25}O_2$ | 0.094 |
| $Na_{0.7}Li_{0.3}Mn_{0.5}Co_{0.5}O_2$ | 0.181 |

The results indicate that the value of Ic/Ip changes according to change of the composition as shown in Table 3.

(6-3) Inventive Examples 14, 15

In each of inventive examples 14, 15, sodium acetate ($CH_3COONa$), lithium carbonate ($Li_2Co_3$), manganese oxide (III) ($Mn_2O_3$) and cobalt oxide (II III) ($Co_3O_4$) were used as starting materials of the positive electrode active material. These materials were prepared such that a composition was $Na_{0.7}Li_xMn_{1-x}O_2$ to be mixed, and fired for 10 hours at 700° C., where the x was 0.1 in the inventive example 14, and 0.2 in the inventive example 15. The fired powders were each again mixed, and fired for 20 hours at 900° C. The fired powders were then ground with the use of an agate mortar, so that the positive electrode active materials were obtained.

Figure 4:
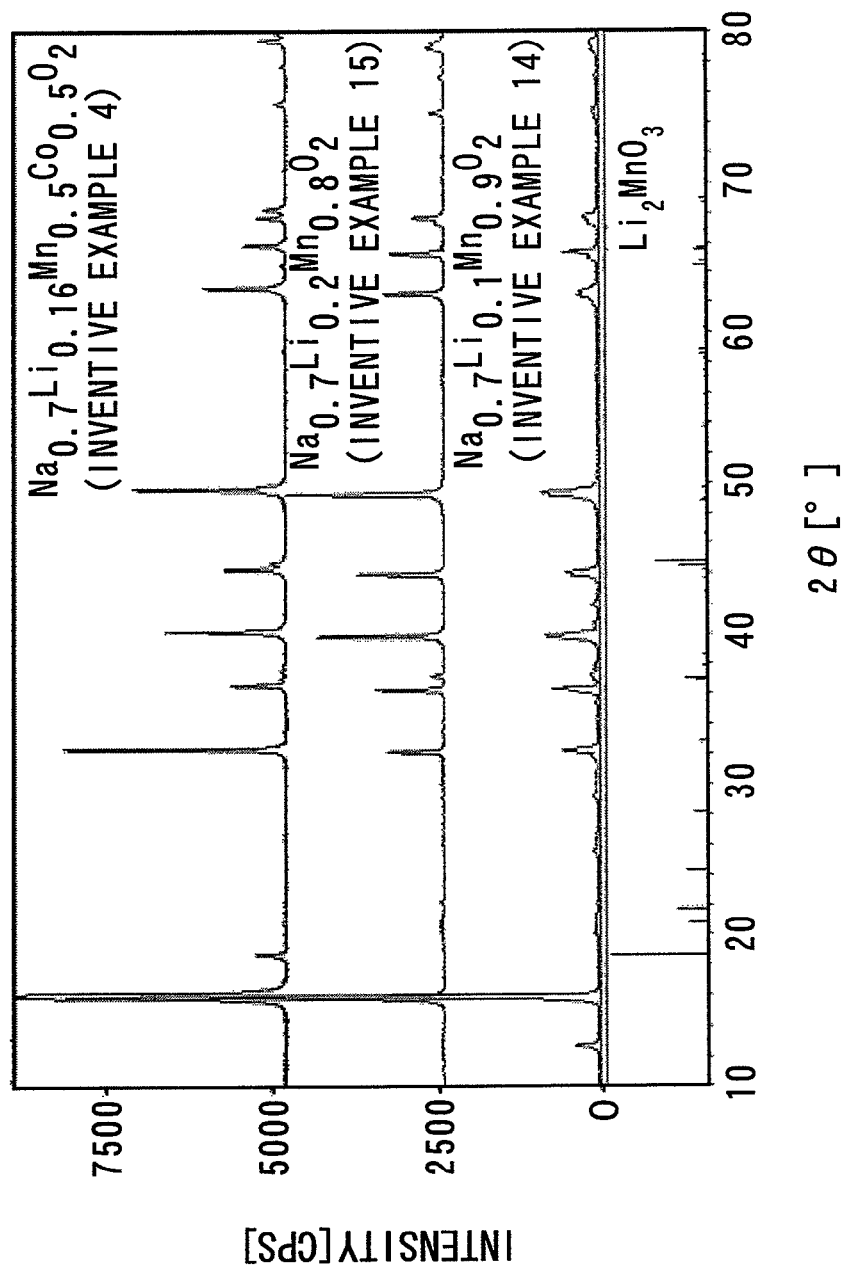
FIG. 4 is a graph showing results of the XRD measurement of positive electrode active materials of inventive examples 4, 14, 15.

The X-ray powder crystal diffraction measurement using the $CuK_\alpha$ as the X-ray source was carried out to the obtained positive electrode active materials. The results are shown in FIG. 4. Note that FIG. 4 shows the results of the X-ray powder crystal diffraction measurement in the inventive examples 14, 15 as well as the results of the X-ray powder crystal diffraction measurement in the inventive example 4 (the $Na_{0.7}Li_{0.16}Mn_{0.5}Co_{0.5}O_2$). Moreover, the X-ray diffraction data of $Li_2MnO_3$ (PDF#84-1634) in the PDF is shown in a lower stage of FIG. 4.

As can be seen from FIG. 4, the peak caused by a $Li_2MnO_3$ phase or a phase corresponding thereto ($Li_2Mn_aCo_{1-a}O_3$, for example) appears in the range of the diffraction angle $2\theta=18.0°$ to $19.5°$ in the X-ray diffraction data of the inventive example 4. A similar peak also appears in the X-ray diffraction data of the inventive example 11 (see FIG. 3).

Meanwhile, the peak does not appear in the range of the diffraction angle $2\theta=18.0°$ to $19.5°$ in the X-ray diffraction data of the inventive examples 14, 15, probably because a manganese layer is replaced by lithium. In the inventive example 14, crystallinity was low and the peak was wide and gradual. In addition, the peak appeared in the range of the diffraction angle $2\theta=12.0°$ to $14.0°$.

As described above, it was found that there was a clear difference in the peak in the range of the diffraction angle $2\theta=18.0°$ to $19.5°$ between the $Na_{0.7}Li_xMO_2$ (which corresponds to the inventive examples 1 to 13) and the $Na_{0.7}Li_xM_{1-x}O_2$ (which corresponds to the inventive examples 14, 15).

(6-4) Comparative Example 2

Synthesis of $Na_{0.8}Li_{0.2}MnO_2$ as the positive electrode active material was carried out in the comparative example 2. First, a $NaMnO_4$ aqueous solution of 0.3 mol/L and a LiCl aqueous solution of 0.3 mol/L were mixed such that a molar ratio of lithium and sodium is Li:Na=1:4. The mixed solution was reacted for 3 days under a hydrothermal condition of 200° C. in an autoclave using an inner cylinder of quartz. Then, a deposit in a vessel is filtered to be washed with water, and heated for 4 hours at 200° C. to remove water of hydration, so that the positive electrode active material was obtained.

Note that an inner cylinder made of fluororesin is generally used for the autoclave. In the case, however, a slight amount of gas is generated from the inner cylinder when the temperature rises to exceed around 180° C. In a pressurized state, the fluororesin starts to be softened when the temperature exceeds around 200° C., and a portion of the fluororesin that is in contact with a metal face is molten when the temperature exceeds around 300° C. In this example, the inner cylinder of quartz was employed in consideration of safety and for suppression of a side reaction to be caused by gas generation.

Figure 5:
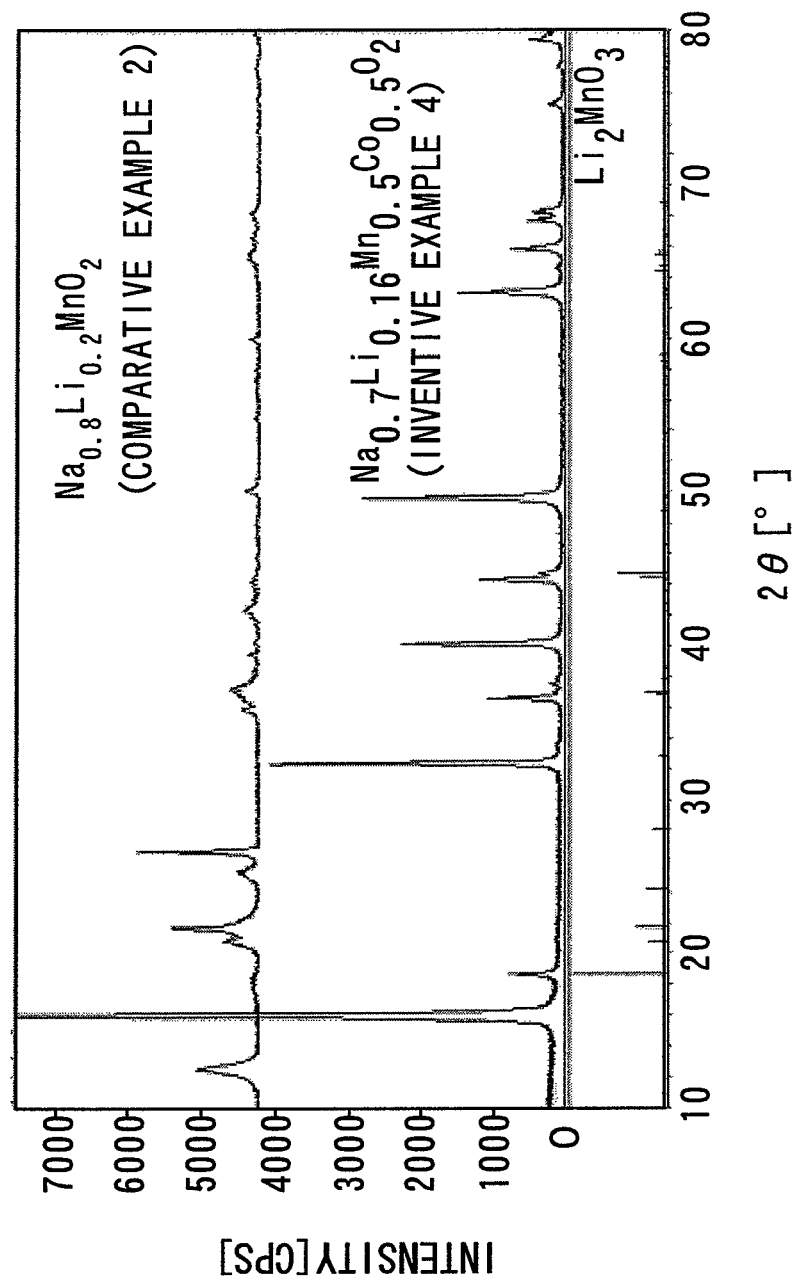
FIG. 5 is a graph showing results of the XRD measurement of positive electrode active materials of the inventive examples 4 and a comparative example 2.

The X-ray powder crystal diffraction measurement using the $CuK_\alpha$ as the X-ray source was carried out to the obtained positive electrode active material. The results are shown in FIG. 5. Note that FIG. 5 shows results of the X-ray powder crystal diffraction measurement in the comparative example 2 and the results of the X-ray powder crystal diffraction measurement in the inventive example 4 (the $Na_{0.7}Li_{0.16}Mn_{0.5}Co_{0.5}O_2$). In addition, X-ray diffraction data of $Li_2MnO_3$ in the PDF is shown in a lower stage of FIG. 5.

As can be seen from FIG. 5, a main peak appeared at the diffraction angle $2\theta=16°$, and a second highest peak appeared in a range of the diffraction angle $2\theta=32.0°$ to $34.5°$ in the X-ray diffraction data of the inventive example 4. In addition, the peak caused by the $i_2MnO_3$ phase or the phase corresponding thereto appeared in the range of the diffraction angle $2\theta=18.0°$ to $19.5°$. Meanwhile, a peak did not appear in these ranges in the X-ray diffraction data of the comparative example 2.

(6-5) Inventive Example 16

In the inventive example 16, sodium hydroxide (NaOH), lithium hydroxide monohydrate $LiOH.H_2O$) and manganese dioxide ($MnO_2$) were used as starting materials of the positive electrode active material. These materials were weighed such that a molar ratio of sodium, lithium and manganese was Na:Li:Mn=0.67: 0.17: 0.83, and agitated while being heated in a sufficient amount of pure water. After water evaporation, the remaining powder was fired for 20 hours at 800° C. in an oxygen stream. Then, the fired powder was rapidly cooled, so that the positive electrode active material was obtained.

Figure 6:
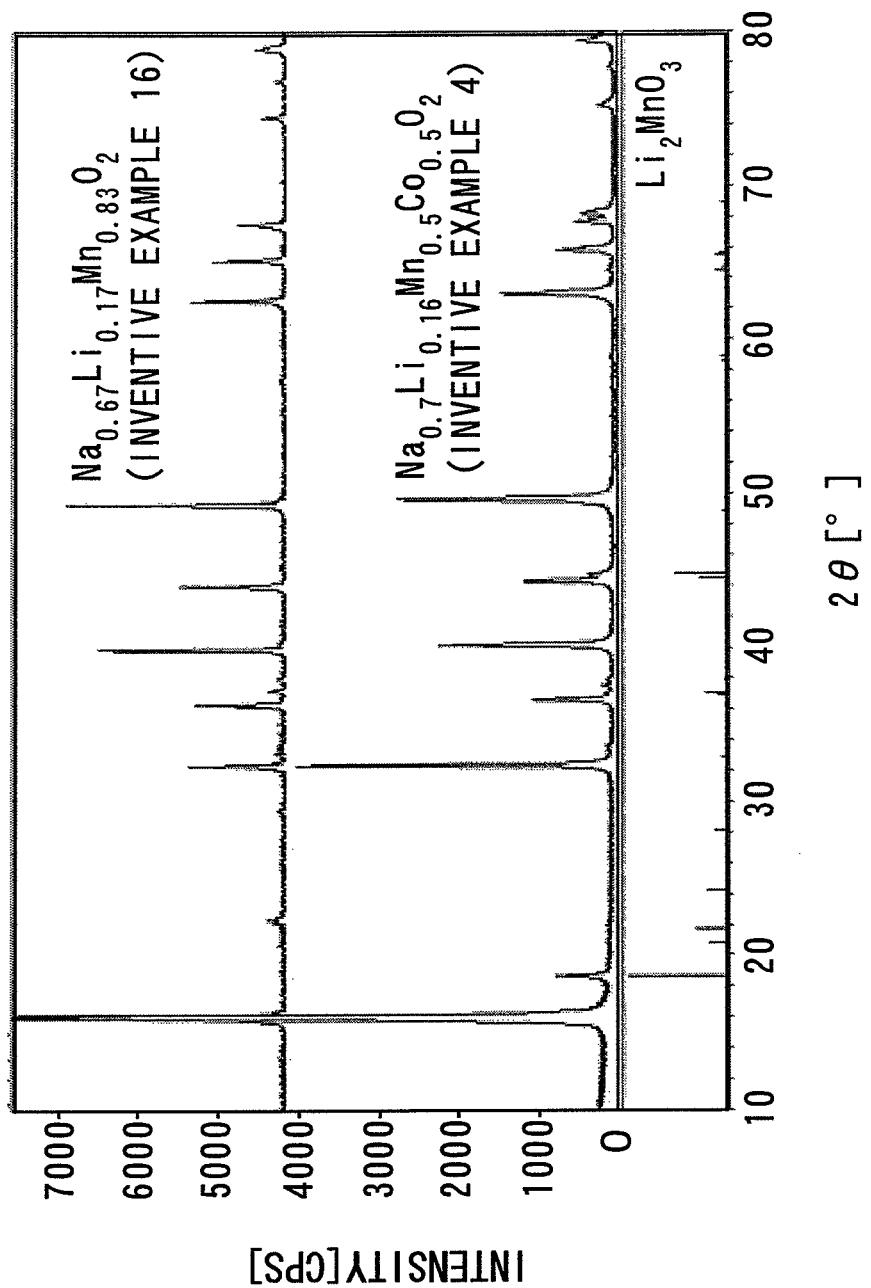
FIG. 6 is a graph showing results of the XRD measurement of positive electrode active materials of inventive examples 4, 16.

The X-ray powder crystal diffraction measurement using the $CuIK_\alpha$ as the X-ray source was carried out to the obtained positive electrode active material. Results are shown in FIG. 6. Note that FIG. 6 shows the results of the X-ray powder crystal diffraction measurement in the inventive example 16 as well as the results of the X-ray powder crystal diffraction measurement in the inventive example 4 (the $Na_{0.7}Li_{0.16}Mn_{0.5}Co_{0.5}O_2$). Moreover, the X-ray diffraction data of $Li_2MnO_3$ in the PDF is shown in a lower stage of FIG. 6.

As can be seen from FIG. 6, the peak caused by the $i_2MnO_3$ phase or the phase corresponding thereto appears in the range of the diffraction angle $2\theta=18.0°$ to $19.5°$ in the X-ray diffraction data of the inventive example 4. Meanwhile, the peak did not appear in this range in the X-ray diffraction data of the inventive examples 16. It is considered that this is because the manganese layer is replaced by lithium. In addition, the peak appeared in a range of the diffraction angle $2\theta=22.0°$ to $24.0°$ in the X-ray diffraction data of the inventive example 16.

INDUSTRIAL APPLICABILITY

The non-aqueous electrolyte secondary battery according to the present invention may be applied as various kinds of power supplies such as a portable power supply and an automotive power supply.

The invention claimed is:

1. A nonaqueous electrolyte secondary battery comprising a positive electrode containing a positive electrode active material made of sodium containing oxide, a negative electrode and a nonaqueous electrolyte, wherein
said sodium containing oxide contains $Na_ALi_BMO_{2\pm\alpha}$ ($0.5 \leq A \leq 1.1$, $0 \leq B \leq 0.3$, and $0 \leq \alpha \leq 0.3$) that belongs to a space group $P6_3/mmc$ of a hexagonal system, where said M includes at least one of manganese and cobalt, and
said nonaqueous electrolyte includes lithium salt.

2. The nonaqueous electrolyte secondary battery according to claim 1, wherein said sodium containing oxide contains $Na_ALi_BMn_xCo_yO_{2\pm\alpha}$ ($0.5 \leq A \leq 1.1$, $0 < B \leq 0.3$, $0.40 \leq x \leq 0.60$, $0.40 \leq y \leq 0.60$, $0.80 \leq x+y \leq 1.20$, and $0 \leq \alpha \leq 0.3$), where a lattice constant a of said sodium containing oxide is not less than 2.830 Å and not more than 2.840 Å, and a lattice constant c is not less than 11.070 Å and not more than 11.090 Å.

3. The nonaqueous electrolyte secondary battery according to claim 1, wherein said sodium containing oxide is one or both of a solid solution and a mixture that have a peak in a range of a diffraction angle 2θ from 18.0° to 19.5° in an X-ray powder crystal diffraction spectrum using CuK$_\alpha$ as an X-ray source.

4. The nonaqueous electrolyte secondary battery according to claim 1, wherein said sodium containing oxide has a first peak in a range of a diffraction angle 2θ from 15.5° to 16.5° and has a second peak in a range of the diffraction angle 2θ from 18.0° to 19.5° in an X-ray powder crystal diffraction spectrum using CuKα as an X-ray source, and
   a ratio Ic/Ip of an intensity Ic of said second peak to an intensity Ip of said first peak is larger than 0 and not more than 0.18.

5. The nonaqueous electrolyte secondary battery according to claim 1, wherein said negative electrode includes at least one selected from a group composed of lithium metal, silicon, carbon, tin, germanium, aluminum, lead, indium, gallium, a lithium containing alloy, a carbon material in which lithium is previously stored, and a silicon material in which lithium is previously stored.

6. The nonaqueous electrolyte secondary battery according to claim 1, wherein said nonaqueous electrolyte includes lithium borate tetrafluoride (LiBF$_4$), lithium phosphate hexafluoride (LiPF$_6$), LiCF$_3$SO$_3$, LiC$_4$F$_9$SO$_3$, LiN(CF$_3$SO$_2$)$_2$, LiN(C$_2$F$_5$SO$_2$)$_2$, LiAsF$_6$ or difluoro (oxalato) lithium borate as said lithium salt.

* * * * *